(12) United States Patent
Ostroff

(10) Patent No.: US 9,870,586 B2
(45) Date of Patent: Jan. 16, 2018

(54) METHOD OF INTEGRATING A CONFIGURATOR INTO AN EXISTING E-COMMERCE PLATFORM

(71) Applicant: Doogma Tech LTD., Petach Tikva (IL)

(72) Inventor: Daniel Reuven Ostroff, Petach Tikva (IL)

( * ) Notice: Subject to any disclaimer, the term of this patent is extended or adjusted under 35 U.S.C. 154(b) by 254 days.

(21) Appl. No.: 14/602,238

(22) Filed: Jan. 21, 2015

(65) Prior Publication Data

US 2015/0134491 A1 May 14, 2015

Related U.S. Application Data

(63) Continuation-in-part of application No. 13/557,705, filed on Jul. 25, 2012, now Pat. No. 9,110,673, which is a continuation-in-part of application No. 12/872,296, filed on Aug. 31, 2010, now Pat. No. 8,516,392.

(60) Provisional application No. 61/674,831, filed on Jul. 23, 2012, provisional application No. 61/585,730, filed on Jan. 12, 2012, provisional application No. 61/511,985, filed on Jul. 26, 2011.

(30) Foreign Application Priority Data

Jan. 22, 2014 (IL) .......................................... 230603

(51) Int. Cl.
*G06Q 30/06* (2012.01)
*G06F 17/22* (2006.01)
*G06F 9/44* (2006.01)

(52) U.S. Cl.
CPC .......... *G06Q 30/0641* (2013.01); *G06F 8/34* (2013.01); *G06F 8/38* (2013.01); *G06F 17/2247* (2013.01); *G06Q 30/0621* (2013.01); *G06Q 30/0643* (2013.01)

(58) Field of Classification Search
CPC ................................ G06Q 30/06; G06F 17/22
USPC .......................................................... 715/800
See application file for complete search history.

(56) References Cited

U.S. PATENT DOCUMENTS

2009/0070666 A1* 3/2009 Eilers ................ G06F 17/30905
715/240

\* cited by examiner

*Primary Examiner* — Tadeese Hailu
*Assistant Examiner* — Darrin Hope
(74) *Attorney, Agent, or Firm* — Stephen E. Zweig

(57) ABSTRACT

System and method for integrating between a graphic user interface and various types of e-commerce platforms. Here various types of e-commerce platforms will typically provide different types of electronic product pages, each typically with various original selection options. The system described herein provides a more standardized configurator and user interface, and uses this more standardized configurator and user interface to capture information from the various e-commerce platforms and display data to the user. The more standardized configurator and user interface can then be used to communicate user selections to the various different types of electronic product pages and platforms.

16 Claims, 11 Drawing Sheets

Sample Code of Drop Down Box

```
<td>
    <select class="">
PIN_1372941533473_hazClickonchange="change_option('SELECT_001_34',this.option(this.selectedIndex).value)" name="SELECT_001_34">
        <option value="165">White</option>
        <option value="167">Green</option>
        <option value="164">Red</option>
        <option value="169">Blue</option>
        <option value="166">Yellow</option>
    </select>
</td>
```

Fig. 2 (PRIOR ART)

Sample Code that Automatically Selects the Appropriate Element in the Dropdown box

```
function skuDispatch(sku, select)
{
if(select)
{
var optionFound = false;
var options = document.getElementsByTagName("option");
for(i=0;i<options.length;i++)
{
if(options[i].value==sku)
{
options[i].selected = "selected";
optionFound = true;
}
}
if(!optionFound && options.length !=0)
alert("The element is currently unavailable.");
}
}
```

Fig. 5A

Sample Embededd Code:

```
><div style="background-color:white;height:800px" id="doogmaPlugin" align="center</"
>script type="text/javascript" src="//e2im.doogma.com/cdn/getparam.js"></script<
>script type="text/javascript" src="//e2im.doogma.com/designers/configurationUrlSave.js"></script<
>script type="text/javascript" src="//e2im.doogma.com/designers/swfobject.js"></script<
>script type="text/javascript" src="//e2im.doogma.com/designers/swfaddress.js"></script<
>script type="text/javascript" src="//e2im.doogma.com/designers/setThumbMetaTag.js"></script<
>script type="text/javascript" src="//e2im.doogma.com/designers/skuSelect.js"></script<
>script type="text/javascript" src="//e2im.doogma.com/designers/clientcode.js"></script<
</div>
<!--END: doogmaPlugin-->
```

Fig. 6

METHOD OF INTEGRATING A CONFIGURATOR INTO AN EXISTING E-COMMERCE PLATFORM

CROSS REFERENCE TO RELATED APPLICATIONS

This application claims the priority benefit of Israel patent application 230603, "METHOD OF INTEGRATING A CONFIGURATOR INTO AN EXISTING E-COMMERCE PLATFORM" Inventor Daniel Reuven Ostroff, filed Jan. 22, 2014; this application is also a continuation in part of U.S. patent application Ser. No. 13/557,705, "SYSTEM AND METHOD OF CREATING AND REMOTELY EDITING INTERACTIVE GENERIC CONFIGURATOR PROGRAMS", Inventor Daniel Reuven Ostroff, Filed Jul. 25, 2012; U.S. application Ser. No. 13/557,705 in turn claimed the priority benefit of provisional applications 61/674,831, filed Jul. 23, 2012, 61/585,730, filed Jan. 12, 2012, and 61/511,985, filed Jul. 26, 2011; U.S. application Ser. No. 13/557,705 was also a continuation in part of U.S. patent application Ser. No. 12/872,296, "INTERACTIVE GENERIC CONFIGURATOR PROGRAM", Inventor Daniel Reuven Ostroff, filed Aug. 31, 2010, now U.S. Pat. No. 8,516,392; the contents of all of these applications are incorporated herein by reference in their entirety.

TECHNOLOGY FIELD

Systems and methods for e-commerce relating to customizable and personalized products, and configurable bundles of products, in particular web based e-commerce systems.

BACKGROUND

Many e-commerce platforms support customization and personalization options for products, e.g. attributes of the desired items such color, size, and shape and the ability to add text to such a product. In many cases, the e-commerce platforms enable the admin user to create these attribute options using fields that can be filled or selected by the user such as text fields or drop-down selection menus with a predefined list of product attributes. It is often desirable to provide a graphic user interface such as a configurator that enables the user to configure or design the product and to see in real-time how such attribute changes or designs will look when applied to the product.

In order to sell customized and personalized products online, merchants typically require an e-commerce platform that enables them to create electronic product pages (e.g. web pages), provide a "shopping cart" and manage customer orders.

In the prior art, the typical way to implement a graphic configurator and to connect it to the shopping cart is by using tightly coupled configurators and shopping carts. In order to achieve such tight coupling, the typical method is that the programmers of the shopping cart and the programmers of the configurator need to work closely together and are often part of the same team. Another method sometimes used or attempted, to connect between the configurator and the e-commerce platform is to use an API (application programming interface). However, the API solution is sometimes limited. The invention herein provides a new method for connecting between a graphic user interface (configurator) and an e-commerce platform or shopping cart.

SUMMARY

According to an aspect of the present invention there is provided a method for integrating between a graphic user interface and an e-commerce platform, comprising: providing an electronic product page comprising original selection options; providing a configurator user interface; displaying said configurator user interface in said page; and providing a method for the configurator user interface to communicate user's selections to the electronic product page.

Providing a configurator user interface may comprise embedding code in said electronic product page markup language definition.

The embedded code may provide tools for assigning menu elements of said electronic product page to said configurator user interface.

The embedded code may provides tools for hiding selected parts of said electronic product page from display.

The method of communicating user's selection may comprise conveying at least one of a unique ID number, a value and a name of the selected item as displayed in a markup language definition of the original electronic product page.

The configurator may read the available options from the electronic product page and if an option is not available the configurator may not display that option or may display it as inactive.

The product may comprise a bundle of products and the method of communicating user's selection may comprise conveying at least one of unique ID numbers, values and names of the selected products as displayed in a markup language definition of the original bundle product page.

According to another aspect of the present invention there is provided a method of adding functionality to an e-commerce platform, comprising:

providing an electronic product page comprising original selection items and at least one text field; providing software for creating a configurator user interface in said electronic product page; and providing a method for the configurator to communicate one of a link and additional text information to the electronic product page.

The link may comprise a link to one of a design and an image.

The additional text information may comprise a markup language definition of a design.

The method may further comprise entering said link into a text field in the product page.

The method may further comprise entering said additional text information into a text field in the product page.

The link entered into the text field may be a link to a print-ready file.

The print-ready file may be a high resolution image file.

According to another aspect of the present invention there is provided a system for integrating between a graphic user interface and an e-commerce platform, comprising: at least one customer computer configured to run a browser, said browser configured to display a merchant's electronic product page; at least one merchant's web server configured to store the merchant's product page code; a configuration server configured to store at least one merchant's configuration user interface; and a configurator embed code embedded in said merchant's product page code, said embed code comprising a link to said stored merchant's configuration user interface.

The embed code may be configured to provide tools for assigning menu elements of said electronic product page to said configurator user interface.

The embed code may be configured to provide tools for hiding selected parts of said electronic product page from display.

The embed code may be configured to communicate user's selection to said product page code.

Communicating user's selection may comprise conveying at least one of a unique ID number, a value and a name of the selected item as displayed in a markup language definition of the electronic product page.

The embed code may be configured to read available options from the electronic product page and if an option is not available the configurator may not display that option or displays it as inactive.

The product may comprises a bundle of products and communicating user's selection may comprise conveying at least one of unique ID numbers, values and names of the selected products as displayed in a markup language definition of the original bundle product page.

BRIEF DESCRIPTION OF THE DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 2 shows an exemplary html code for defining a drop-down menu for choices such as those shown in FIG. 1;

FIGS. 5A and 5B show a sample code for automatically selecting the appropriate element in the drop-down menu and a flowchart of the process, respectively;

FIG. 6 shows an exemplary graphic configurator embed code to be embedded in an electronic product page;

DETAILED DESCRIPTION OF THE INVENTION

The method of the present invention enables the use of a graphic configurator as the front-end wherein users can design or select options for their desired product using a graphic user interface, and combining this with an existing e-commerce platform that supports customization and/or personalization options, typically in the form of open text fields and drop down menus or radio buttons without a graphic user interface. The method defines how these two parts—the graphic configurator front-end and the original e-commerce platform—can be integrated to work together.

The present invention is described herein in conjunction with an exemplary graphic configurator interface such as the IGCP (Interactive Generic Configurator Program), as described for example in U.S. Pat. No. 8,516,392 (incorporated inhere in its entirety), using a plurality of graphic layer files comprising various layers of the item desired for configuration. Generally at least some of this plurality of graphic layer files will contain some transparent pixels. The graphic configurator also involves at least one main description file, which may be in XML format, which describes the relationships between this plurality of graphic layer files. An interactive generic configurator program that is capable of reading and parsing this main description file, and displaying icons on the GUI that are representative of various user configurator selections is then used to implement the configurator, often within a web browser over the internet.

It is understood that other implementations of a graphic user interface are also considered for integration with electronic product pages according to the present invention.

According to the method of the present invention, two entities (1) an electronic Product Page—typically part of an e-commerce platform and (2) a Graphic Configurator may be separate entities created and maintained by separate software teams who do not need to work together or use an API in order to connect between the entities. In fact, according to this method, the Graphic Configurator can be embedded even in Electronic product pages created without any intention of being connected to a graphic configurator. The method requires that an administrator or the software itself reads the relevant source code (typically in a markup language like html) of the electronic product page wherein the product attribute dropdown boxes, radio buttons and/or text input fields are defined.

Figure 1:
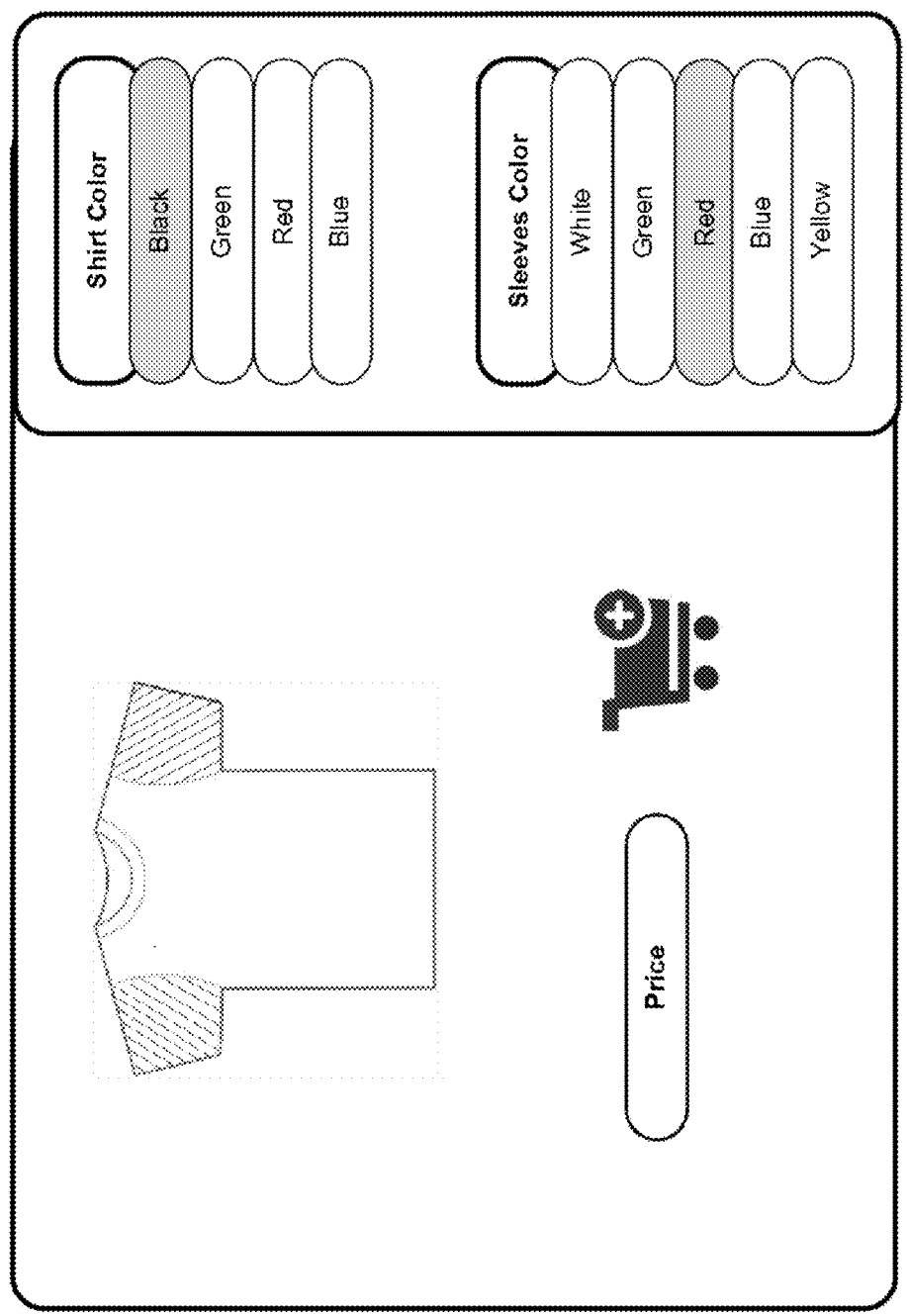
FIG. 1 shows an exemplary prior art electronic product page with attribute options provided as a drop-down menu.

When attribute options are provided on an electronic product page, for example as a drop-down menu, such as exemplified in FIG. 1, html code is typically used to display and select the relevant options. In most cases an ID, Value or Name is assigned to each option. FIG. 2 shows an exemplary html code for defining the drop-down menu of FIG. 1, where each line comprises the textual menu item (e.g. "Green") and a respective ID or value (e.g. 164).

The administrator (or the software) can then assign these unique IDs to elements of the graphic configurator, e.g. by using a browser's html Inspect Element feature. In this method, a look-up table is created for the configurator, to which each original ID, Value or Name is added as a parameter for the corresponding configurator element.

The software of the configurator can then output these unique IDs each time a corresponding option has been selected in the configurator.

Alternatively or in addition, when the user has completed a design the software can output a string to be placed in a text input area that corresponds with the unique ID.

Using this method, the e-commerce platform software does not have to be modified in any way in order to allow for a graphic configurator to be embedded in an electronic product page. An embed code such as shown in FIG. 6 can be added to the electronic product page within a field in the e-commerce platform. Typically the embed code can be placed in any field or electronic product page template that allows for html code. The embed code can then be implemented using client side code such as html or javascript.

According to this method, each time an option is selected in the configurator and/or when the user clicks a button such as Add To Cart to signal that the user has completed the design and wishes to save it or purchase the product, the corresponding options are output from the configurator program with the corresponding values and unique IDs. The software can then "force" the selection of the corresponding option from an original drop-down menu or radio button and/or enter the text string produced in the configurator program to the corresponding text field in the electronic product page. These values and options are then stored in the electronic product page in the same way as they would have been had a user entered the values. The rest of the flow of the e-commerce process, i.e. purchase of the product and management of the purchase order can now be continued in the same way as if a user had selected and entered such values manually directly into the electronic product page.

The process of "forcing" the selected options and entering the strings into the text fields can be carried out using client side programming languages such as Javascript. An example of such code is provided in FIG. 5A.

In some embodiments, the Graphic Configurator can determine whether a specific option is unavailable by reading the html of the page. For example, using the html code shown in FIG. 2, if a particular color such as "Red" is currently unavailable then the corresponding option "164" will not be displayed in the html code. These options are typically controlled by the administrator of the electronic page or by the ecommerce software itself (e.g. if several items using the option have been purchased, it might automatically be set to "out of stock" and will not appear on the electronic product page). The Graphic Configurator can then display the Configurator but without an option for the user to select Red. This option can be removed from the Configurator or disabled (grayed out).

Figures 9A, 9B:
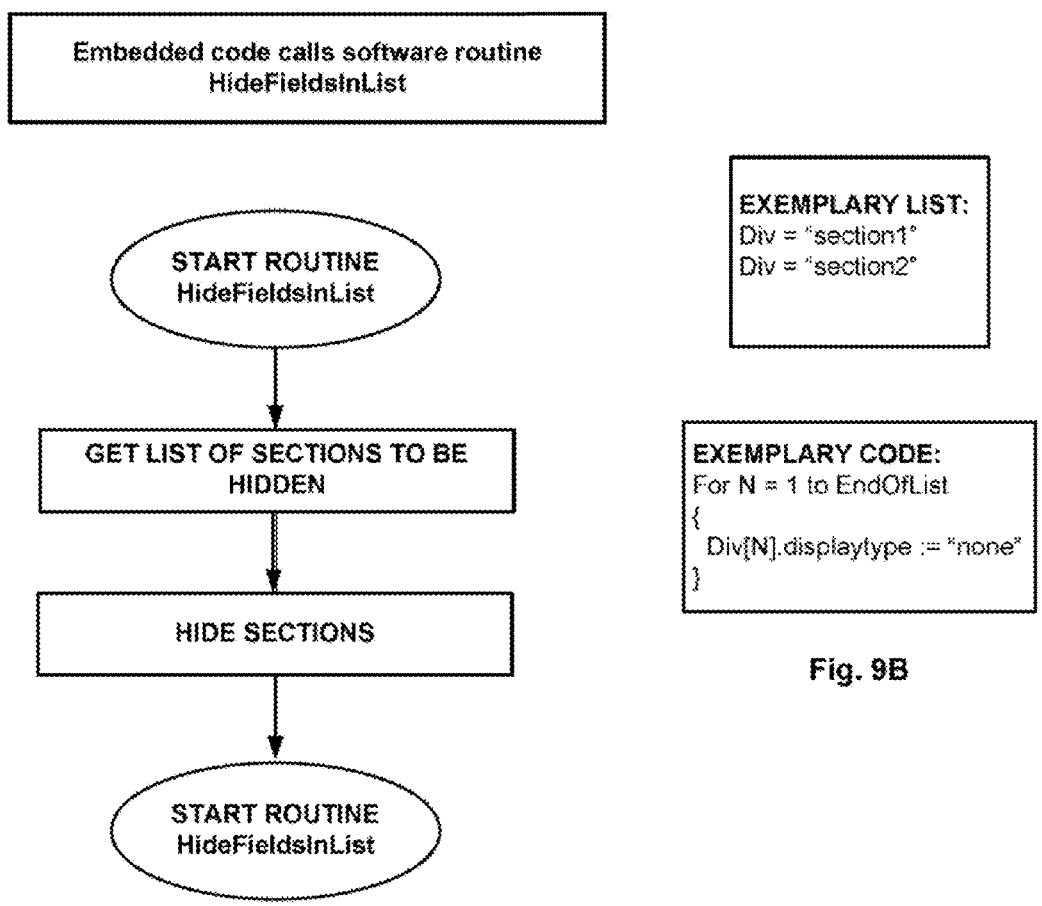
FIG. 9A shows an exemplary embed code for hiding original menu parts.
FIG. 9B shows an exemplary list of sections to be hidden and the respective code.

In some embodiments, as shown in FIG. 9A, the code that is embedded in the electronic product page can call software routines that hide the original attribute options that were shown on the page. Even though such options are hidden from the view of the end-user, they are still available to the software which can "force" the changes. The list of sections of the electronic product page that should be hidden can be provided by an administrator and the software hides all the sections specified in this list.

FIG. 9B shows an exemplary list of sections to be hidden and the respective code.

Figure 3:
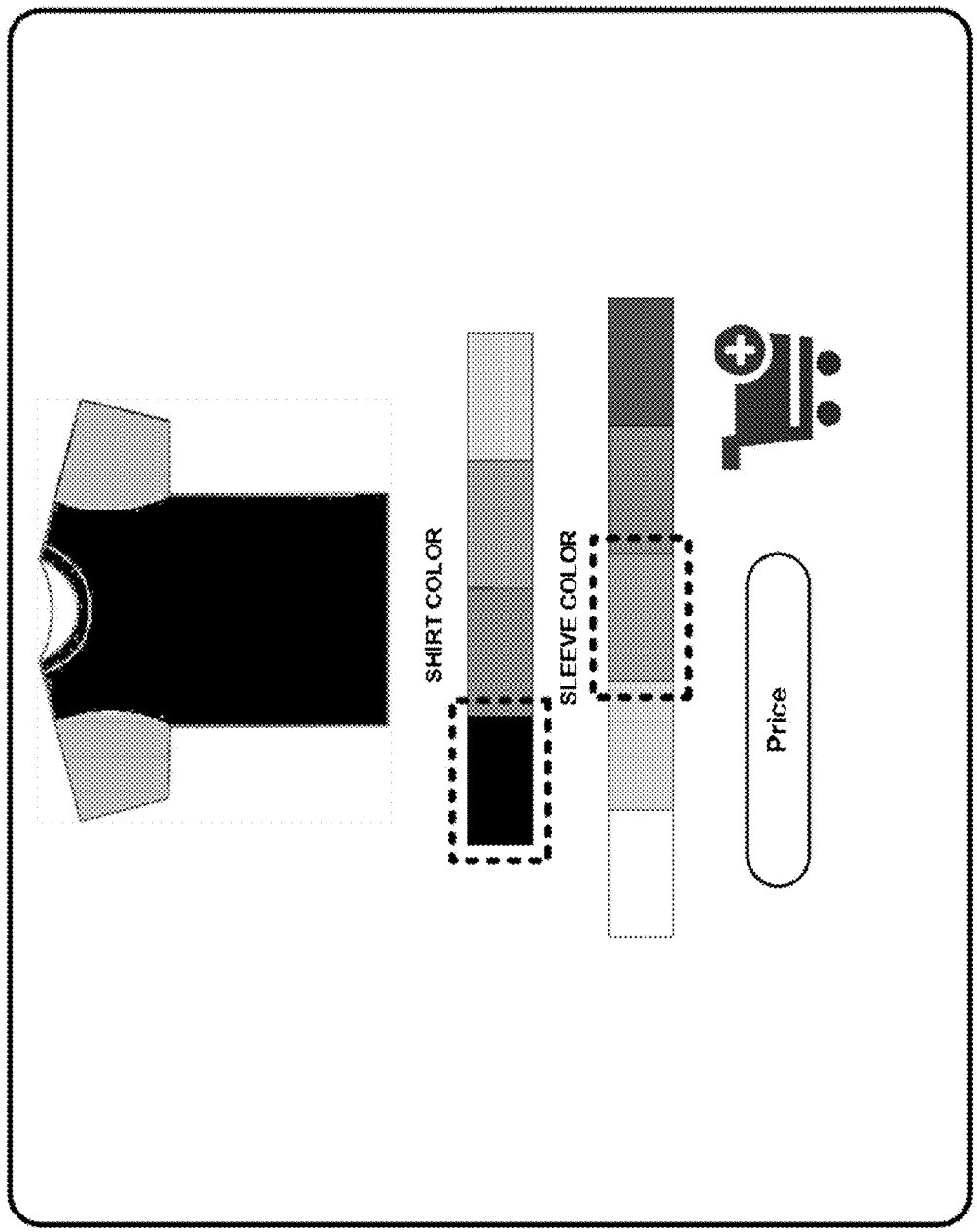
FIGS. 3 and 4 show the graphic configurator user interface displayed in the exemplary electronic product page of FIG. 1, representing two different selection options (shirt color and sleeve color)
Figure 4:
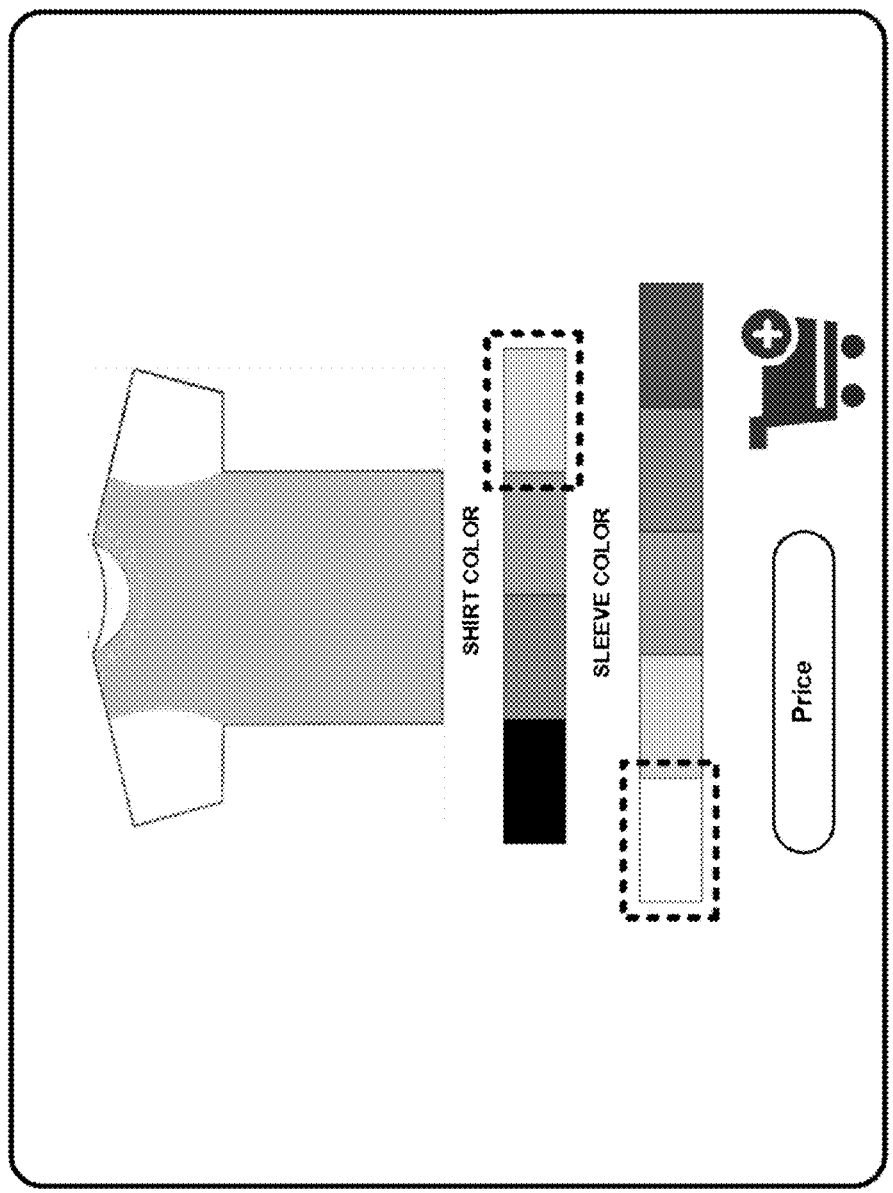
Figure 5B:
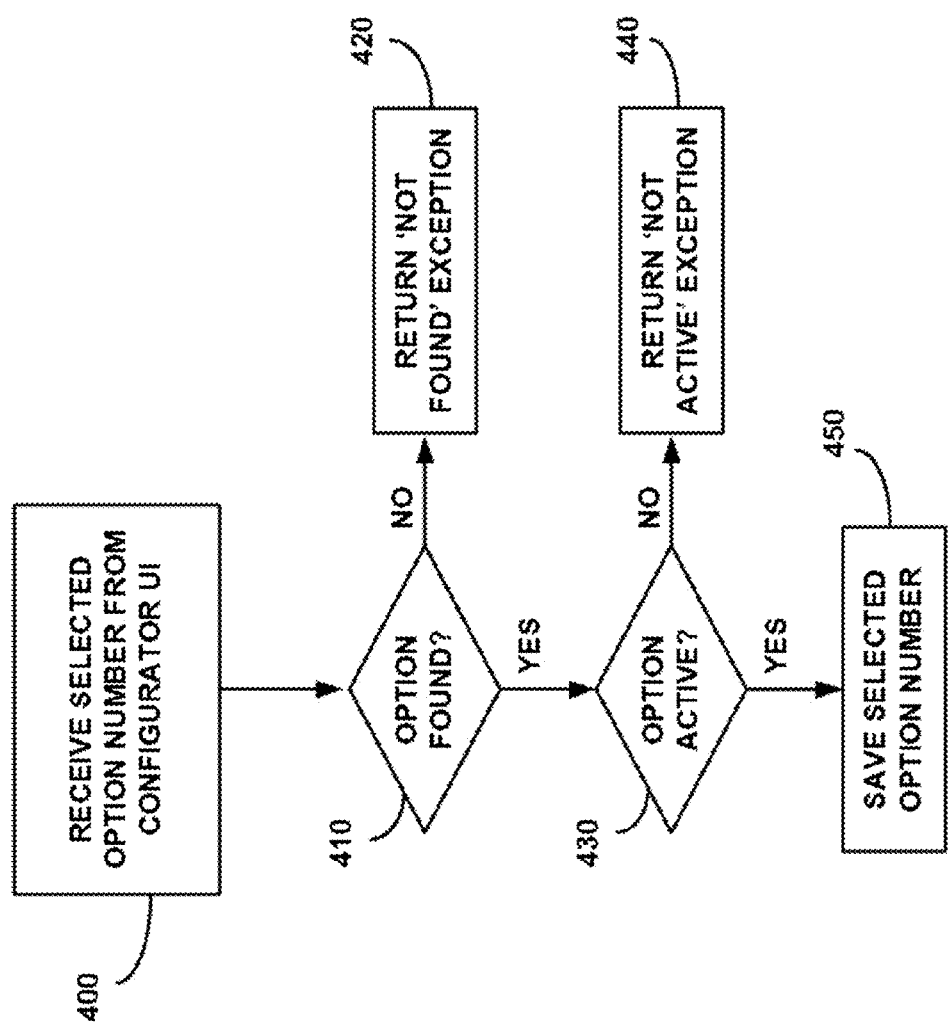

FIGS. 3 and 4 show the graphic configurator user interface displayed in the exemplary electronic product page of FIG. 1, representing two different selections. As can be seen, the original drop-down menu has been replaced with a different selection UI and additional viewing options have been provided for displaying a simulation of the selected characteristics. When the user selects an element from the configurator UI, whose value corresponds to one that exists in the drop-down menu, the embed code finds the original attribute in the lookup table and causes the desired item to be selected by simulating a selection in the original menu. FIG. 5A shows a sample code for automatically selecting the appropriate element in the drop-down menu and FIG. 5B shows a flowchart of the process.

In step 400 the embed code receives a selected option number from the configurator UI.

In step 410 the selected option number is searched and if not found an exception is returned to the configurator 420.

Otherwise, in step 430 the selected option number is tested and if not active an exception is returned to the configurator 440.

Otherwise, the selection is saved 450 i.e. the selection is "forced" as described above.

Thus, the original e-commerce platform is unaware of the enhanced selection tools provided to facilitate selection of one of its original menu items.

According to embodiments of the invention, each time the configurator is invoked it may check whether the last saved menu options still represent the most updated list of items for selection. For example, an item may be missing from stock or an item may have been added since the last update. The configurator updates the list and saves the updated list before displaying the menu and therefore does not display items that are no longer available.

According to embodiments of the present invention, the configurator may be applied to pages that allow the selection of a number of products or items that "go together" as a collection or bundle of products and interchange each one independently. For such pages the configurator may add the capability of viewing a dynamic composite image of the selected products. For example, when displaying a lady's blouse, additional items may also be offered such as a matching handbag, jewelry, skirt, shoes or the like. As another example, when displaying a sofa, additional items for the living room may be also displayed for sale within the same picture, such as matching chairs, rugs, tables, decorative cushions, and the like.

According to embodiments of the present invention the new configurator may add options to pre-existing e-commerce platforms. For example, numerous e-commerce product pages include one or more text fields used for general user comments or for specific user orders regarding packaging, shipment, etc. The text entered into these text fields is incorporated in the resulting purchase order. The text fields also have unique IDs or names. The present invention may use these existing text fields to store text entered by the user in the IGCP and/or to store a link to a saved configuration or a link to an image (regular resolution or high-resolution) created within the IGCP. The Value or Name can be passed to the IGCP when a save button or Add To Cart button are clicked. At that time the IGCP can create the saved configuration and images and pass them as links or as a detailed xml table or other data structure in a string format so that they are placed within the corresponding Text Field.

The example below demonstrates how an existing e-commerce platform may use the configurator of the present invention to expand its usability to types of "shops" previously not compatible with its standard configuration (e.g. web-to-print shops).

Figure 7:
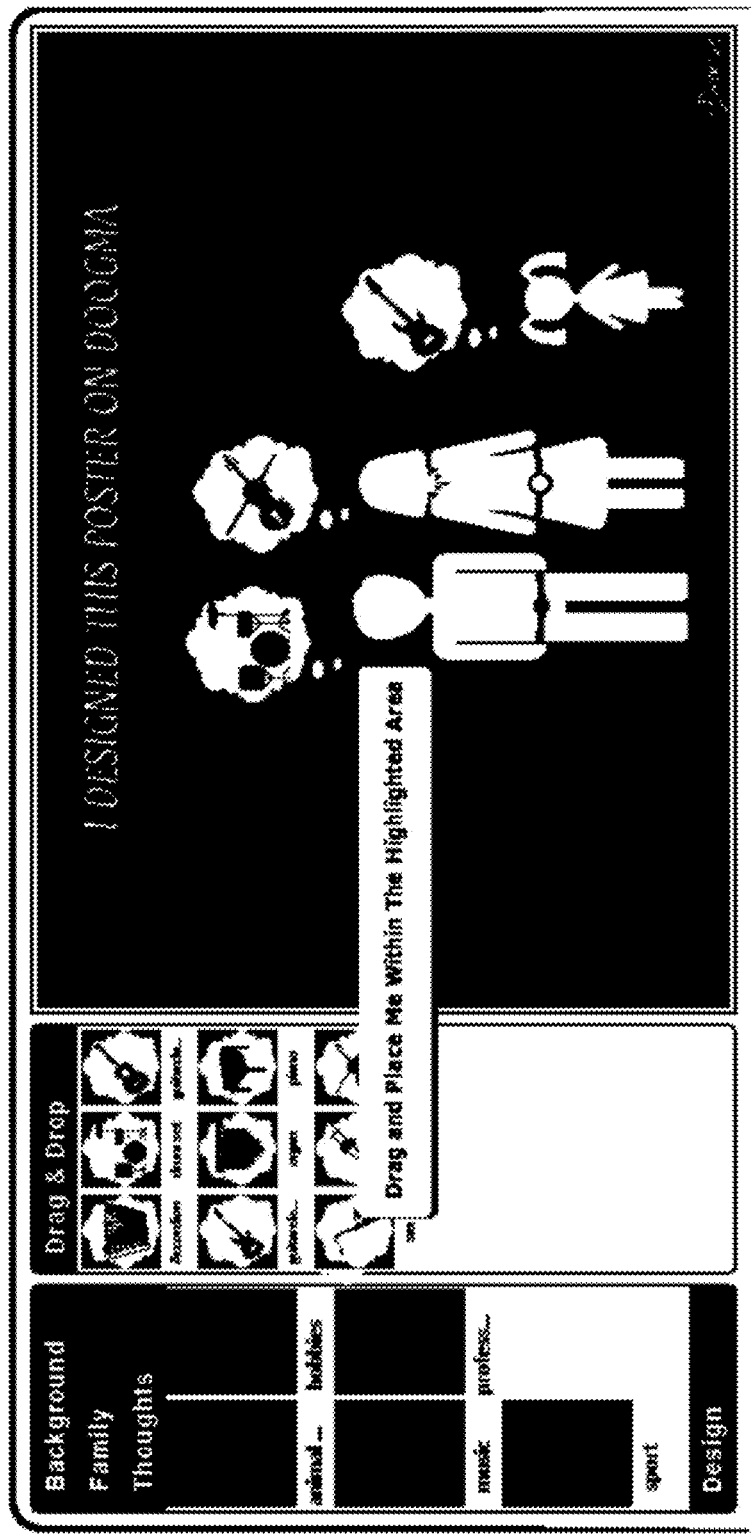
FIG. 7 shows an exemplary configurator UI that may provide for freestyle design of a poster.

FIG. 7 shows an exemplary configurator UI that may provide for freestyle design of a poster to be printed by a web-to-print facility. In this example the configurator may enable the selection of various canvases, colors, fonts, stored images, uploaded images, etc. When the design has been done, e.g. when the user hits "Add To Cart", the configurator may use text fields to save pointers (URLs) for one or all of:

A low-res picture of the preview as seen by the user;
A high-res proof picture to be communicated to the printer;
A link to the saved configuration, to enable future repeat orders.

Figure 8:
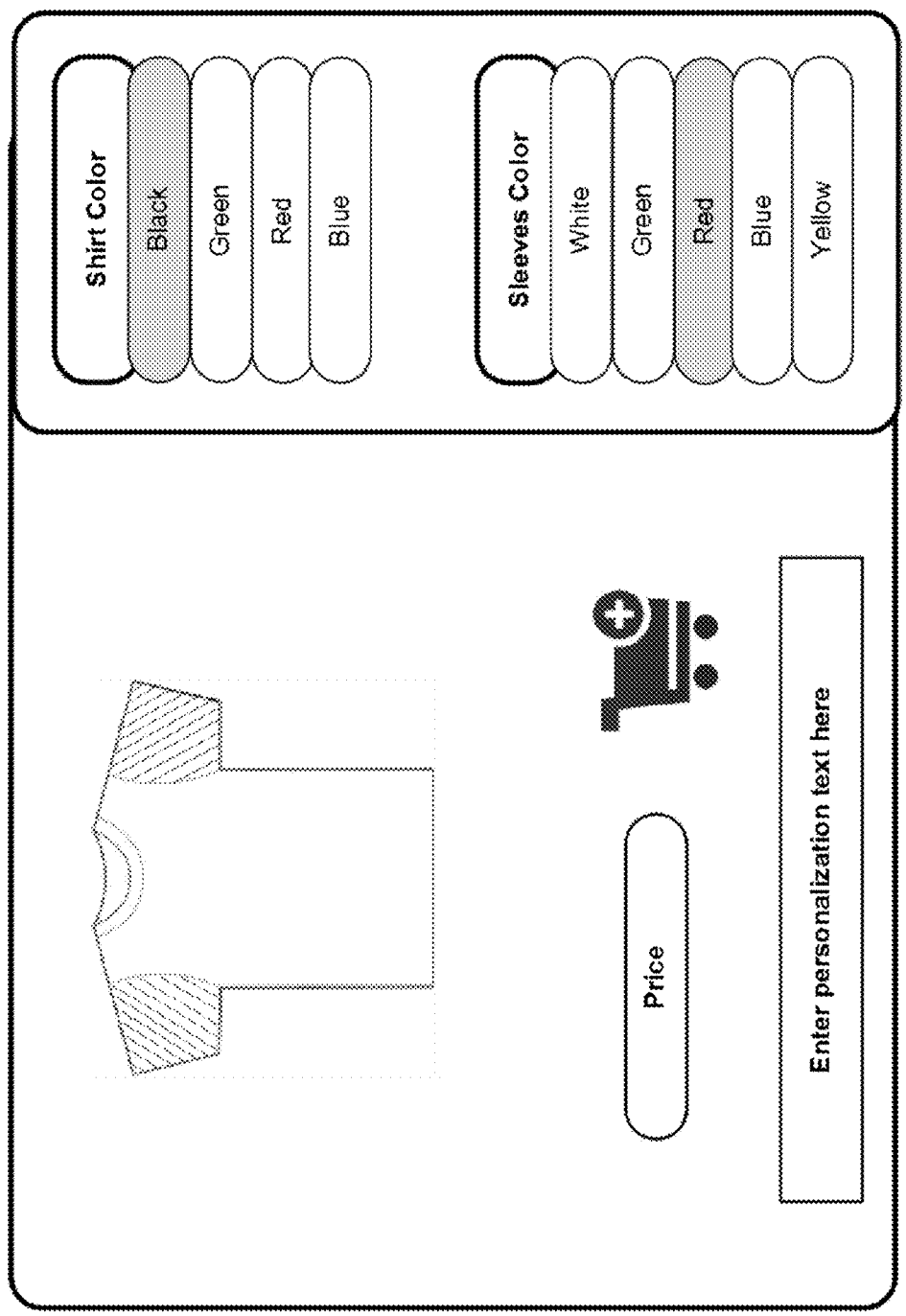
FIG. 8 shows an exemplary configurator UI comprising a text field used for storing a pointer.

FIG. 8 shows an exemplary configurator UI comprising a text field that may be used for storing a pointer.

The configuration may be saved by the configurator in a proprietary database and may be loaded as a default configuration or by request the next time the user uses the same e-commerce venue.

Figure 10:
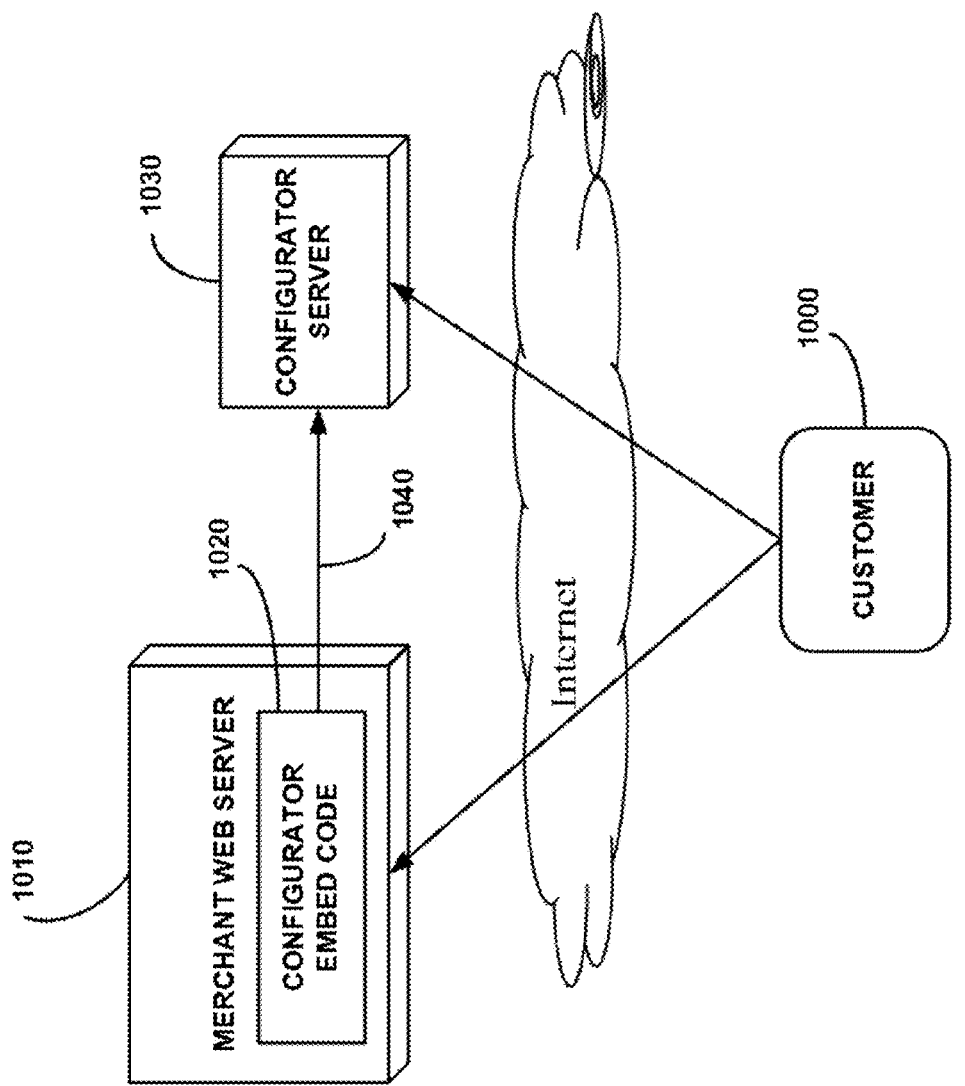
FIG. 10 is a block diagram of the system components for carrying out the present invention.

FIG. 10 is a block diagram of the system components for carrying out the present invention.

The system comprises at least one customer 1000 computer using a browser for browsing a merchant's website, at least one merchant's web server 1010 storing the merchant's web site code including a user interface configurator embed code 1020 which provides a link 1040 to the merchant's user interface configurator stored on the configuration server 1030.

Incorporation by reference: the complete contents of U.S. patent application Ser. No. 13/557,705; U.S. provisional applications 61/674,831, 61/585,730, and 61/511,985; as well as U.S. application Ser. No. 13/557,705 are incorporated herein by reference.

The invention claimed is:

1. A method for integrating between a web browser based graphic configurator user interface and an e-commerce platform, said e-commerce platform comprising at least one customer computer configured to run a web browser, and at least one merchant web server configured to store a electronic product page, said method comprising:
   using said merchant web server to provide said electronic product page to said web browser, said electronic product page comprising a plurality of items and original selection options for at least some of said plurality of items;
   providing a web browser based graphic configurator user interface that uses a plurality of graphic layer files comprising various layers of an item desired for configuration to create composite images of said item at said web browser;
   wherein said web browser based graphic configurator uses a plurality of graphic layer files comprising various layers of an item desired for configuration to create composite images of said item at said web browser by:
   using a plurality of graphic layer files and graphic layer thumbnail files comprising various layers of one item;
   wherein at least some of said plurality of graphic layer files contain some transparent pixels;
   using at least one main description file describing relationships between said plurality of graphic layer files; and
   using said web browser based graphic configurator to read and parse this main description file, and displays icons on a GUI of said web browser based graphic configurator that are representative of various user configurator selections;
   displaying said configurator user interface in said web browser; and
   using said configurator user interface to communicate at least one selected product option to or from said electronic product page.

2. The method of claim 1, wherein said providing a configurator user interface comprises embedding configurator embed code in a markup language definition of said electronic product page;
   said electronic product page allowing for html code, said embed code configured to be implemented using client side code comprising any of html and javascript;
   wherein said embedded code provides tools for assigning or reading selected menu elements of said electronic product page to said web browser based graphic configurator user interface.

3. The method of claim 2, wherein said embedded code provides tools for using said configurator to hide selected parts of said electronic product page from display.

4. The method of claim 1, wherein using said web browser based graphic configurator user interface to communicate at least one selected item to said electronic product page comprises conveying at least one of a unique ID number, a value and a name of said at least one selected item as displayed in a markup language definition of said electronic product page.

5. The method of claim 4, wherein said electronic product page comprises available options, and said configurator reads the said available options from said electronic product page and if an option is not available the configurator does not display that option or displays it as inactive.

6. The method of claim 1, wherein said item comprises a bundle of product items, and wherein using said configurator user interface to communicate at least one product comprises conveying at least one of unique ID numbers, values and names of at least one selected product items as displayed in a markup language definition of an original electronic product page for said bundle of product items.

7. The method of claim 1, further obtaining said web browser based graphic configurator from a configurator server that is different from said merchant web server.

8. The method of claim 7, further using a link provided by said merchant web server to obtain said web browser based graphic configurator from said configurator server.

9. A method of adding functionality to an e-commerce platform, said e-commerce platform comprising at least one customer computer configured to run a web browser, and at least one merchant web server configured to store an electronic product page, said method, comprising:
   using said merchant web server to provide said electronic product page to said web browser, said electronic product page comprising original selection items and at least one text field; and at least one embed code;
   said electronic product page allowing for html code, said embed code configured to be implemented using client side code comprising any of html and javascript;
   providing software for creating a web browser based graphic configurator user interface that uses a plurality of graphic layer files comprising various layers of an item desired for configuration to create composite images of said item at said web browser in said electronic product page;
   wherein said web browser based graphic configurator uses a plurality of graphic layer files comprising various layers of an item desired for configuration to create composite images of said item at said web browser by:
   using a plurality of graphic layer files and graphic layer thumbnail files comprising various layers of one item;
   wherein at least some of said plurality of graphic layer files contain some transparent pixels;
   using at least one main description file describing relationships between said plurality of graphic layer files; and
   using said web browser based graphic configurator to read and parse this main description file, and displays icons on a GUI of said web browser based graphic configurator that are representative of various user configurator selections; and
   using said configurator to communicate one of a link and additional text information to said merchant web server providing said electronic product page.

10. The method of claim 9, wherein the link entered into the text field is a link to a print-ready file that will be created within a web browser.

11. A system for integrating between a web browser based graphic configurator user interface and an e-commerce platform said system comprising:
- an e-commerce platform comprising at least one customer computer, and at least one merchant's web server configured to store a merchant's electronic product page;
- said at least one customer computer configured to run a web browser, said web browser configured to display a merchant's electronic product page provided by said at least one merchant's web server;
- said at least one merchant's web server configured to store product page code for said merchant's electronic product page;
- said system further comprising a configuration server configured to store at least one merchant's configuration user interface;
- a configurator embed code embedded in said merchant's electronic product page code; said embed code comprising a link to said configuration server configured to store said at least one merchant's web browser based graphic configuration user interface;
- wherein said web browser based graphic configurator is configured to use a plurality of graphic layer files comprising various layers of an item desired for configuration to create composite images of said item at said web browser by:
- using a plurality of graphic layer files and graphic layer thumbnail files comprising various layers of one item;
- wherein at least some of said plurality of graphic layer files contain some transparent pixels;
- using at least one main description file describing relationships between said plurality of graphic layer files; and
- using said web browser based graphic configurator to read and parse this main description file, and displays icons on a GUI of said web browser based graphic configurator that are representative of various user configurator selections; and
- said electronic product page is configured to allow for html code, and said embed code is configured to be implemented using client side code comprising any of html and javascript.

12. The system of claim 11, wherein said embed code is further configured to provide tools for assigning menu elements of said electronic product page to said web browser based configurator user interface.

13. The system of claim 11, wherein said embed code is further configured to provide tools for using said configurator to hide selected parts of said electronic product page from display; or
wherein said embed code is configured to read available options from said electronic product page and if an option is not available said configurator does not display that option or displays it as inactive.

14. The system of claim 11, wherein said electronic product page comprises a plurality of items and original selection options for at least some of said plurality of items; and
wherein said embed code is further configured to communicate a user's selected product option to or from said electronic product page code.

15. The system of claim 14, wherein said web browser based graphic configurator user interface is configured to communicate a selection by conveying at least one of a unique ID number, a value and a name of said selected product option or a selected product item as displayed in a markup language definition of the electronic product page.

16. The system of claim 14, wherein said plurality of items comprises a bundle of product items and wherein said web browser based graphic configurator user interface is configured to communicate user's selection comprises conveying at least one of unique ID numbers, values and names of selected product items as displayed in a markup language definition of an original electronic product page for said bundle of product items.

* * * * *